(12) United States Patent
Loh et al.

(10) Patent No.: US 7,105,197 B2
(45) Date of Patent: Sep. 12, 2006

(54) PROCESS FOR PREPARING INTERMEDIATE MOISTURE VEGETABLES

(75) Inventors: Jimbay P. Loh, Green Oaks, IL (US); Yeong-Ching Albert Hong, Kildeer, IL (US); Dalip Nayyar, Grayslake, IL (US); Lisa Jane Apel, Evanston, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 235 days.

(21) Appl. No.: 10/354,427

(22) Filed: Jan. 30, 2003

(65) Prior Publication Data

US 2004/0151825 A1 Aug. 5, 2004

(51) Int. Cl.
*A23L 3/40* (2006.01)

(52) U.S. Cl. .............. 426/640; 426/615; 426/321; 426/324; 426/442; 426/443

(58) Field of Classification Search ........... 426/615, 426/640, 321, 324, 442, 443
See application file for complete search history.

(56) References Cited

U.S. PATENT DOCUMENTS

| | | | |
|---|---|---|---|
| 3,595,681 A | 7/1971 | Kaplow et al. | |
| 3,623,893 A * | 11/1971 | Mange | 426/281 |
| 3,745,027 A | 7/1973 | Kaplow et al. | |
| 3,801,714 A | 4/1974 | Shipman et al. | |
| 4,510,164 A * | 4/1985 | Staley et al. | 426/331 |
| 4,683,141 A * | 7/1987 | Lewis et al. | 426/639 |
| 4,832,969 A | 5/1989 | Lioutas | |
| 4,946,693 A | 8/1990 | Risler et al. | |
| 5,110,609 A | 5/1992 | Lewis et al. | |
| 5,364,643 A | 11/1994 | Morimoto et al. | |
| 5,925,395 A | 7/1999 | Chen | |
| 6,159,527 A | 12/2000 | Wettlaufer | |
| 6,403,134 B1 | 6/2002 | Nayyar et al. | |
| 2001/0043981 A1 * | 11/2001 | Lewis et al. | 426/615 |

FOREIGN PATENT DOCUMENTS

| | | |
|---|---|---|
| EP | 0 337 249 | 10/1989 |
| EP | 0 812 543 | 12/1997 |
| WO | WO 94/24876 | 11/1994 |

* cited by examiner

*Primary Examiner*—Helen Pratt
(74) *Attorney, Agent, or Firm*—Fitch, Even, Tabin & Flannery

(57) ABSTRACT

Methods are provided for preparing intermediate moisture vegetables. In one embodiment, this invention relates to a method for preparing intermediate moisture vegetables, said method comprising (1) predrying the vegetables to a moisture content of less than about 5 percent, (2) applying a low viscosity infusion cocktail comprising water, a polyhydric alcohol, and salt to the predried vegetables, (3) equilibrating the predried vegetables and infusion cocktail for at least about 30 minutes to provide the intermediate moisture vegetables, and (4) and packaging the intermediate moisture vegetables; wherein the infusion cocktail contains essentially no sugars or saccharides. When cooked, these intermediate moisture vegetables provide appearance, texture, and taste similar to that provided by high quality cooked individually quick frozen vegetables.

37 Claims, No Drawings

PROCESS FOR PREPARING INTERMEDIATE MOISTURE VEGETABLES

FIELD OF THE INVENTION

This invention relates to methods for preparing intermediate moisture vegetables. In one embodiment, this invention relates to a method for preparing intermediate moisture vegetables, said method comprising (1) predrying the vegetables to a moisture content of less than about 5 percent, (2) applying a low viscosity infusion cocktail comprising water, a polyhydric alcohol, and salt to the predried vegetables, and (3) equilibrating the predried vegetables and infusion cocktail for at least about 30 minutes to provide the intermediate moisture vegetables having a water activity ($A_w$) of about 0.5 to about 0.9; wherein the infusion cocktail contains essentially no sugars or saccharides.

In another embodiment, this invention also relates to a method for preparing intermediate moisture vegetables, said method comprising (1) applying a low viscosity infusion cocktail comprising water, a polyhydric alcohol, and salt to vegetables having moisture content of less than about 5 percent, and (2) equilibrating the vegetables and infusion cocktail for at least about 30 minutes to provide the intermediate moisture vegetables having a water activity ($A_w$) of about 0.5 to about 0.9; wherein the infusion cocktail contains essentially no sugars or saccharides.

In another embodiment, this invention also relates to a method for preparing intermediate moisture green vegetables, said method comprising (1) applying an alkaline, low viscosity infusion cocktail comprising water, a polyhydric alcohol, an alkaline material, and salt to vegetables having moisture content of less than about 5 percent, and (2) equilibrating the vegetables and infusion cocktail for at least about 30 minutes to provide the intermediate moisture green vegetables having a water activity of about 0.5 to about 0.9; wherein the infusion cocktail contains essentially no sugars or saccharides.

The preferred polyhydric alcohol is glycerol. Intermediate moisture vegetables produced by this invention and having a water activity of about 0.5 to about 0.65 are shelf stable for at least about two months under ambient conditions or at least about 150 days under refrigeration conditions; intermediate moisture vegetables having a water activity of about 0.65 to about 0.9 are shelf stable for at least about 150 days under refrigeration conditions. When cooked, these intermediate moisture vegetables provide appearance, texture, and taste similar to that provided by high quality cooked individually quick frozen (IQF) vegetables.

BACKGROUND OF THE INVENTION

Dried packaged convenience foods or mixes, such as, for example, soups, casseroles, salads, and the like, are popular. Such foods or mixes frequently contain various types of dehydrated vegetables (generally with water activities of less than about 0.5) along with other food components. Unfortunately, such dehydrated vegetables, when cooked, tend to rehydrate slowly, require long cooking times, and generally do not resemble fresh vegetables in terms of color, texture, and/or nutrition. In addition, dried vegetables tend to fracture easily during handling and distribution resulting in large amount of powdery fines and an undesirable, unnatural appearance. One of the alternatives to dried vegetables is infused or intermediate water activity vegetables by infusing blanched vegetable with a low-$A_w$ infusion mixture and followed by drying the infused vegetable to an $A_w$ below about 0.9, and more typically below about 0.6. The accumulated thermal effect during conventional infusion and subsequent drying steps, especially in presence of reducing sugars or other saccharides, renders significant quality loss in infused vegetables. The sugars and other saccharides used in conventional infused intermediate moisture vegetables also impart undesirable candy-like appearance and surface stickiness.

Numerous attempts have been made to prepare infused and/or dehydrated vegetables having improved properties. U.S. Pat. No. 3,623,893 (Nov. 30, 1971) used super-atmospheric pressures (i.e., 200 to 4000 psi) to infuse foods, including vegetables, with an aqueous infusion cocktail containing propylene glycol, potassium sorbate, glycerol, and salt. Of course, the use of such high pressures would involve high capital expense if such a system were used commercially.

U.S. Pat. No. 3,745,027 (Jul. 10, 1973) provided a method for cooking vegetables in an infusion mixture containing, for example, glycerol, salt, propylene glycol, potassium sorbate, and water. For example, diced carrots cooked for 15 minutes in the infusion mixture and then soaked for 6 hours in the infusion mixture were reported to have "acceptable eating qualities and microorganic stability."

U.S. Pat. No. 4,832,969 (May 23, 1989) provides improved dried green vegetables using an infusion cocktail containing a polyhydric alcohol, a sugar, an alkaline buffering system or agent (i.e., sufficient to obtain a cocktail pH of about 6 to 8), an inorganic bittering agent (e.g., KCl and/or $MgCl_2$), a surfactant, salt, and an anti-oxidant (e.g., vitamin E, tocopherol, BHA, BHT, or mixtures thereof). After treatment with the infusion cocktail, the vegetable pieces are dried to a water activity of about 0.3 to 0.85 at a temperature of less than about 135° F. The resulting dried green vegetables are reported to have superior color retention for extended time periods even at room temperature storage, superior texture upon rehydration, and excellent rehydration rates.

U.S. Pat. No. 4,946,693 (Aug. 7, 1990) provides a process for preparing intermediate moisture vegetables. In this process, vegetables are blanched or cooked, preferably using a microwave oven, and then partially dried (i.e., water content of 45 to 55 percent). The dried vegetables are then dry mixed with salt (and optionally sodium glutamate if the vegetables are not cooked using a microwave oven); an anti-mycotic agent can also be added.

U.S. Pat. No. 5,110,609 (May 5, 1992) provides a method for producing intermediate moisture vegetables wherein the vegetables are partially dehydrated to a moisture content of 26 to 60 percent and then stored in an oxygen free atmosphere.

U.S. Pat. No. 5,925,395 (Jul. 20, 1999) provides a method for preserving vegetables whereby the vegetables are treated with a preservative solution containing water, calcium ions, and optionally ascorbic acid or erythorbic acid. The resulting vegetables are then stored at a non-freezing temperature less than 20° C. If stored at ambient temperatures, microbial contamination is possible.

U.S. Pat. No. 6,159,527 (Dec. 12, 2000) provides a method and apparatus for infusing fruit, including vegetables, using an infusion cocktail containing sugar wherein the flowrate and infusion cocktail are controlled such that the fruit or vegetables are exposed to progressively higher concentrations of sugar of a level only slightly higher than the sugar content of the fruit or vegetables being infused.

More recently, U.S. Pat. No. 6,403,134 (Jun. 11, 2002) provides a method for preparing intermediate moisture vegetables by (a) infusing vegetables with an antimicrobial infusion cocktail at a temperature of greater than about 50° F. for about 15 to about 180 minutes, wherein the antimicrobial infusion cocktail comprises an aqueous solution of (1) a water-soluble, predominantly lower molecular weight, low sweetness carbohydrate, (2) a polyhydric alcohol, (3) salt, (4) a non-inorganic sweetness depressant agent, and (5) nisin-containing whey derived from a nisin-producing culture; (b) collecting the vegetables and removing excess antimicrobial infusion cocktail; (c) drying the collected vegetables to a water activity of about 0.5 to about 0.9 to form the intermediate moisture vegetables; and (d) packaging the intermediate moisture vegetables.

Although these methods can provide improved intermediate moisture vegetables, there remains a need for even further improvements. The present method provides such improvements. Indeed, the present method allows the preparation of intermediate moisture vegetables which are shelf stable and which have significantly improved organoleptic properties. In taste tests, the present intermediate moisture vegetables were often ranked as good as or even better than cooked frozen vegetables, including high quality individually quick frozen (IQF vegetables).

SUMMARY OF THE INVENTION

This invention relates to methods for preparing intermediate moisture vegetables. More specifically, this invention relates to methods for preparing intermediate moisture vegetables wherein predried vegetables are treated with an edible, low water activity, low viscosity infusion cocktail to achieve appearance and quality similar to the original, natural vegetables. In one embodiment, this invention relates to a method for preparing intermediate moisture vegetables, said method comprising (1) predrying the vegetables to a moisture content of less than about 5 percent, (2) applying a low viscosity infusion cocktail comprising water, a polyhydric alcohol, and salt to the predried vegetables, and (3) equilibrating the predried vegetables and infusion cocktail for at least about 30 minutes to provide the intermediate moisture vegetables having a water activity of about 0.5 to about 0.9; wherein the infusion cocktail contains essentially no sugars or saccharides.

In another embodiment, this invention also relates to a method for preparing intermediate moisture vegetables, said method comprising (1) applying a low viscosity infusion cocktail comprising water, a polyhydric alcohol, and salt to vegetables having moisture content of less than about 5 percent, and (2) equilibrating the vegetables and infusion cocktail for at least about 30 minutes to provide the intermediate moisture vegetables having a water activity of about 0.5 to about 0.9; wherein the infusion cocktail contains essentially no sugars or saccharides.

In another embodiment, this invention also relates to a method for preparing intermediate moisture green vegetables, said method comprising (1) applying an alkaline, low viscosity infusion cocktail comprising water, a polyhydric alcohol, an alkaline material, and salt to the green vegetables having moisture content of less than about 5 percent, and (2) equilibrating the green vegetables and infusion cocktail for at least about 30 minutes to provide the intermediate moisture green vegetables having a water activity of about 0.5 to about 0.9; wherein the infusion cocktail contains essentially no sugars or saccharides. Generally, sufficient alkaline material is added to the infusion cocktail to provide a pH greater than about 8.

Equilibration of the predried vegetables and infusion cocktail (i.e., direct contact of the predried vegetables and infusion cocktail) is for at least about 30 minutes. Generally, the equilibration period is sufficient such that at least 95 percent of the infusion cocktail is absorbed into the vegetables when the ratio of infusion cocktail to vegetables is in the optimum range of about 0.5 to about 3.5 parts infusion cocktail per 1 part vegetables. Generally, equilibration is carried out for at least about 30 minutes; generally equilibration times longer than about 24 hours are not needed. Of course, as those skilled in the art will realize, equilibration of the of the absorbed infusion cocktail throughout the vegetables may continue after removal of the vegetables from the bulk infusion cocktail.

The preferred polyhydric alcohol is glycerol. Intermediate moisture vegetables produced by this invention and having a water activity of about 0.5 to about 0.65 are shelf stable for at least about two months under ambient conditions or at least about 150 days under refrigeration conditions; intermediate moisture vegetables having a water activity of about 0.65 to about 0.9 are shelf stable for at least about 150 days under refrigeration conditions. When cooked, these intermediate moisture vegetables provide appearance, texture, and taste similar to that provided by high quality cooked IQF vegetables.

The process provided herein is both simple and efficient as compared to conventional infusion processes. The active portions of present process (i.e., all process steps other than initial drying step and the equilibration step) can be completed in a relatively short time at ambient temperatures and pressures. No heat treatment is required in the process of the present invention (except, in some case, during the initial drying step). Preferably the ratio of infusion cocktail and vegetables are adjusted so that all infusion cocktail is absorbed by the vegetables; thus, in most cases, there is essentially no waste or spent infusion cocktail. The present invention also provides significant cost savings as compared to conventional infusion processes. It is estimated that the present process provides intermediate moisture vegetables at a cost comparable to, and in some cases down to about ⅛ of, conventional infusion processes based per serving size. Moreover, due at least in part to the minimal thermal treatment to which the vegetables are exposed, the intermediate moisture vegetables produced by the present invention are superior to conventionally prepared intermediate moisture vegetables in appearance (i.e., color and plumpness), texture, flavor, taste, and handling properties (i.e., free flowing, non-sticky, and non-brittle).

DETAILED DESCRIPTION OF THE INVENTION

The present invention provides a simple, cost effective method for preparing intermediate moisture vegetables. In one embodiment, the intermediate moisture vegetables are prepared by a method comprising (1) predrying the vegetables to a moisture content of less than about 5 percent, (2) applying a low viscosity infusion cocktail comprising water, a polyhydric alcohol, and salt to the predried vegetables, and (3) equilibrating the predried vegetables and infusion cocktail for at least about 30 minutes to provide the intermediate moisture vegetables; wherein the infusion cocktail contains essentially no sugars or saccharides.

In another embodiment, the intermediate moisture vegetables are prepared by a method comprising (1) applying a low viscosity infusion cocktail comprising water, a polyhydric alcohol, and salt to vegetables having moisture content of less than about 5 percent, and (2) equilibrating the vegetables and infusion cocktail for at least about 30 minutes to provide the intermediate moisture vegetables; wherein the infusion cocktail contains essentially no sugars or saccharides.

In another embodiment, this invention also relates to a method for preparing intermediate moisture green vegetables, said method comprising (1) applying an alkaline, low viscosity infusion cocktail comprising water, a polyhydric alcohol, an alkaline material, and salt to the green vegetables having moisture content of less than about 5 percent, and (2) equilibrating the green vegetables and infusion cocktail for at least about 30 minutes to provide the intermediate moisture green vegetables having a water activity of about 0.5 to about 0.9; wherein the infusion cocktail contains essentially no sugars or saccharides. Generally, sufficient alkaline material is added to provide a pH greater than about 8.

The vegetables to be treated by the present method should have a moisture content of less than about 5 percent, preferably less than about 4 percent. Any conventional drying technique can be used to prepare the low moisture vegetables suitable for use in the present invention. Generally, drying methods which cause minimal damage to the cellular structure of the vegetables are preferred. Thus, gentle drying techniques (e.g., freeze drying, vacuum drying, and the like) are preferred. More preferably, freeze drying is used.

The infusion cocktail can be applied using any conventional technique (e.g., spraying, dipping, soaking, tumbling, and the like). Preferably, the relative amounts of vegetables and the infusion cocktail are adjusted so that a majority of the infusion cocktail, and more preferably about 95 percent or more of the infusion cocktail, is absorbed by the vegetables. The infusion cocktail and vegetables can also be combined in a container whereby the infusion cocktail is absorbed by the vegetables; if desired, gentle mixing can be employed to uniformly distribute the infusion cocktail throughout the vegetables. Preferably such a container is sealable so that it can be used both as the cocktail infusion container and as the package for the ultimate product. Thus, preferably the sealed container is a plastic pouch of suitable size, material, and construction for providing the intermediate moisture vegetables to the consumer. Generally the infusion cocktail and the vegetables are mixed until at least about 95 percent of the infusion cocktail are absorbed by or adhered to the vegetables. The so-treated vegetables can then be packaged in appropriate containers; equilibration of the absorbed or adhered infusion cocktail into the vegetables can, of course, continue in the containers. If desired, the intermediate moisture vegetables may be removed from the container used for the equilibration and repackaged in suitable containers for the wholesale or retail markets. Preferably, exposure of the vegetables to light and/or oxygen during the infusion process/packaging and/or later storage should be avoided or minimized in order to obtain the best quality.

The infusion cocktail comprises water, a polyhydric alcohol, and salt. The infusion cocktail contains essentially no sugars or saccharides (e.g., maltose, dextrose, and the like). For purposes of this invention, an infusion cocktail containing "essentially no sugars or saccharides" is meant to mean that the cocktail contains less than about 50 percent of such components and preferably no added sugars or saccharides. For purposes of this invention, "low viscosity" in relation to the infusion cocktail is intended to mean a viscosity of less than about 200 cps and preferably less than about 120 cps at about 25° C.

Generally, the infusion cocktail includes about 30 to about 40 percent water, about 50 to about 75 percent polyhydric alcohol, and about 1 to about 10 percent salt. More preferably, the infusion cocktail includes about 30 to about 35 percent water, about 50 to about 65 percent polyhydric alcohol, and about 3 to about 5 percent salt. The infusion cocktail may also contain other optional ingredients or components such as, for example, spices, flavorants, nutrients, vitamins, nutraceutical additives, colorants, color enhancers, taste suppressants, preservatives, and the like so long as they do not adversely effect the organoleptic and/or stability properties in a significant manner. Thus, one preferred infusion cocktail of the present invention consists essentially of about 30 to about 35 percent water, about 50 to about 65 percent polyhydric alcohol, about 3 to about 5 percent salt, and 0 to about 5 percent of an optional ingredient selected from the group consisting of spices, flavorants, nutrients, vitamins, nutraceutical additives, colorants, color enhancers, taste suppressants, and mixtures thereof.

The relative amounts of water, polyhydric alcohol, and salt in the infusion cocktail can be varied with the above described limits to achieve the desired levels of the viscosity of the infusion cocktail and the water activity of the final intermediate moisture vegetables. Preferably, the relative amounts of vegetables and infusion cocktail are adjusted so that a majority of the infusion cocktail, and more preferably about 90 percent or more, is absorbed by the vegetables. Additionally, the amount of polyhydric alcohol should preferably be kept, when possible, to the low end of these ranges due to their relatively high viscosity and their sweet taste.

Using glycerol as the polyhydric alcohol, an empirical model has been developed to assist in predicting the viscosity of the infusion cocktail and the water activity of the final intermediate moisture vegetables as a function of the major components. In this model, [glycerol], [salt], and [water] are weight concentrations of glycerol, salt, and water, respectively, expressed as the weight fraction of total infusion cocktail composition. For example, [glycerol]=0.60 means glycerol forms 60 percent of the infusion cocktail composition. The following equations were determined for the viscosity (expressed in pascals) and the water activity, respectively, of the infusion cocktail:

Viscosity (pascals) =0.4515 [glycerol]−2.0921 [salt]+ 0.1696 [water]+2.9196 [glycerol][salt]−1.1356 [water][glycerol]+1.7531 [salt][water]

and $A_w$ (infusion cocktail)=0.1884 [glycerol]−0.2597 [salt]+0.9188 [water]−0.1876 [glycerol][salt]+ 1.0165 [water][glycerol]+0.7823 [salt][water].

Such equations can be developed for individual processes using known modeling techniques. As those skilled in the art will realize, the specific coefficients in such equations will vary depending on many variables relating to the actual components used, the purity of the components, the processing equipment and conditions, and the like.

The $A_w$ of the finished vegetables produced by this invention will generally be just slightly lower than the $A_w$ of the infusion cocktail used. Thus, the $A_w$ of the infusion cocktail should be no more than about 0.02 units (preferably no more than about 0.01 units) of the desired target or final value of the finished intermediate moisture vegetables. For example, if a water activity of about 0.5 is desired for the finished intermediate moisture vegetables, the water activity of the infusion cocktail should generally be no more than about 0.52 and preferably no more than about 0.51.

Polyhydric alcohols (i.e., polyols) are included in the infusion cocktail as humectants and texture enhancers. Generally the polyhydric alcohols useful in this invention have a low taste intensity and are relatively low molecular weight (i.e., less than about 136 g/mole) alcohols having two or more hydroxyl groups. Examples of suitable polyhydric alcohols include such as glycerol (glycerine or 1,2,3-propanetriol), propylene glycol, and the like as well as mixtures thereof. Glycerol is the preferred polyhydric alcohol for use in this invention. The polyhydric alcohols appear to keep the vegetable tissue soft and easily rehydratable during cooking; they also serve to lower the water activity.

Salt is also included in the infusion cocktail. Since salt is a more effective water binding agent than the polyhydric alcohols, it is generally preferred that higher levels of salt within the ranges specified be used so long as permitted by taste. Increased salt levels allow for lower polyhydric alcohol levels and higher water levels to be used to achieve the desired water activity. Lower polyhydric alcohol levels and higher water levels results in reduced sweetness and lower infusion cocktail viscosity. Lower infusion cocktail viscosity allows higher processing efficiencies due to higher rates of diffusion or absorption of the infusion cocktail in the vegetables. Salt also tends to balance the taste profile, reduce aftertaste normally associated with glycerol or glycerine, and act as a taste enhancer.

As noted above, the infusion cocktails may also contain other optional ingredients or components such as, for example, spices, flavorants, nutrients, vitamins, nutraceutical additives, colorants, color enhancers, taste suppressants, preservatives, and the like, as well as mixtures thereof, so long as they do not adversely effect the organoleptic and/or stability properties in a significant manner. Suitable vitamins that may be included in the infusion cocktail include, for example, vitamin A, vitamin C, vitamin D, vitamin E, B vitamins, niacin, folate, folic acid, and the like as well as mixtures thereof. Suitable minerals include, for example, salts of metal nutrients, wherein the metals are chosen from among calcium, magnesium, copper, iron, zinc, chromium, and the like as wells as mixtures thereof; salts of inorganic minerals such as, for example, phosphate, sulfate, chloride, and the like as well as mixtures thereof can also be used. Suitable antioxidants include, for example, tocopherol and the like. Suitable botanicals include, for example St. John's wort, ginseng, ginkgo biloba, and the like as well as mixtures thereof. Suitable preservatives include, for example, calcium lactate, sorbic acid, and the like and natural antimycotic agents such as nisin-containing cultured whey (generally at 2000 ppm or less; see, for example, U.S. Pat. No. 6,403,134 (Jun. 11, 2002). Of course, as those skilled in the art will realize, other vitamins, minerals, antioxidants, botanicals, and color enhancers can also be used in the present invention. The amount of such optional ingredients can, of course, vary considerably depending on the specific nutrient or mineral added (and its recommended daily requirement) and the targeted consumer. For example, macronuterients (e.g., calcium) can be added at relatively high levels (i.e., up to about 5 percent) whereas other trace minerals, vitamins, and other additives (i.e., generally materials having daily adult requirements in the milligram range or lower) will normally be added at much lower levels.

The infusion cocktail is prepared by simply mixing or combining the components with gentle agitation to form an essentially homogenous slurry, suspension, or infusion bath. If desired, the infusion cocktail or bath is heated to, and held at, a temperature of greater than about 165° F. for about 30 to about 60 seconds (or equivalent pasteurization conditions). Pasteurization of the infusion cocktail is especially preferred when the infusion cocktail contains natural or other ingredients (e.g., spices and the like) which may contain microorganisms. If pasteurization is used, the infusion cocktail is cooled to its operating temperature before use. Preferably, the infusion cocktail is maintained at an operating temperature of about 40 to about 100° F., preferably about 40 to about 60° F., during use.

Generally, the final pH of the intermediate moisture vegetables of this invention will be determined by the pH of the infusion cocktail and the ratio of the vegetables to infusion cocktail. For green vegetables, the pH of infusion cocktail is preferably adjusted with a base to greater than about 7.0 (preferably about 7.5 to about 9 and more preferably about 8.2 to about 8.7) to provide a pH for the intermediate moisture vegetables greater than about 7. Such an alkaline pH helps to stabilize the chlorophyll and provide a natural, bright green color of the vegetables. Any edible base can be used for pH adjustment including, for example, soluble alkaline oxide or hydroxides (e.g., MgO, CaO, Mg(OH)2, NaOH), high pH buffering salts (e.g., trisodium citrate). Optionally, additional multivalent metal cations (e.g., $Mg^{+2}$, $Fe^{+2}$, $Zn^{+2}$, $Cu^{+2}$ and the like from water soluble salts such as chlorides, sulfates, citrates, and the like) can also be added to aid in further stabilizing chlorophyll. In general, pH adjustment alone is sufficient to ensure commercially required shelf life under refrigeration conditions. Multivalent metal cations provided added benefit for ambient stable intermediate moisture (i.e., $A_w$ about 0.5 to 0.65) vegetables.

Using these infusion cocktail formulations, intermediate moisture vegetables which are shelf stable and, when cooked, provide appearance, texture, and taste similar to that provided by high quality cooked IQF vegetables can be prepared. Moreover, the intermediate moisture vegetables of this invention readily, quickly, and uniformly rehydrate when cooked. Such intermediate moisture vegetables are ideally suited for use in refrigerated meals or meal kits such as soups, casseroles, salads, pasta, rice, potato, oriental, or stir fry type dishes, and the like.

The vegetables, reduced in size if appropriate, are blanched and then dried to a moisture content of less than about 5 percent, preferably less than about 4 percent. Relatively gentle drying techniques (e.g., vacuum or freeze drying) are preferably used in order to minimize structural damage or collapse of the vegetable's cellular structure. Commercially available, high quality vacuum or freeze dried vegetables can also be used in the practice of this invention. The infusion cocktail is then applied to the dried vegetables using conventional techniques (e.g., spraying, dipping, soaking, tumbling, and the like) in order to coat the vegetable surfaces uniformly. This initial step of the present invention generally involves a brief (generally less than about 20 minutes and more typically about 2 to 5 minutes) coating treatment at or below ambient temperatures (typically about 40 to about 60° F). Thus, the present invention minimizes thermal exposure of the vegetables. Conventional infusion processes, on the other hand, generally involve significant thermal exposure which can result in loss of vegetable quality.

The process of the present invention may be operated in batch, semi-continuous, or continuos mode as desired so long as sufficient infusion cocktail is allowed to adhere to the vegetables surfaces and ultimately penetrate into the cellular structures. Generally, the present process is carried out at or near ambient temperatures (i.e., about 40 to about 60° F.) and pressures. Although not necessary, the vegetables can be blanched (e.g., cooked in a water bath at about 165° F. or greater for up to about 10 minutes) prior to the infusion process.

The present invention can be used to prepare a wide variety of green, yellow, orange, and red vegetables. Such vegetables include, for example, carrots, various types of peppers, broccoli, various types of peas and pea-pods, cauliflower, onions, tomatoes, mushrooms, zucchini, corn, celery, asparagus, green beans, water chestnuts, bamboo shoots, and the like. Generally, the vegetables are first cut into appropriate sizes (generally bit sized) prior to infusion; larger pieces can be used, if desired, so long as the infusion process is modified (e.g., increased duration) to allow for sufficient infusion of the cocktail. Of course, smaller vegetables such as peas and pea-pods can be, and preferably are, used whole without any reduction in size.

Generally the infusion cocktail is applied at a ratio of about 0.5 to about 3.5 parts per 1 part vegetables. Preferably the vegetables (especially for vegetables such as broccoli and mushrooms) are subjected to gentle agitation during the initial stage of the infusion process (e.g., first 5 to 10 minutes) to provide more uniform uptake of the infusion cocktail. The vegetable pieces should remain in contact with the infusion cocktail at a temperature (preferably near or below ambient temperatures) and for a time sufficient to allow the infusion cocktail to infuse into, and preferably throughout, the internal vegetable structures. Although higher temperatures can be used to shorten the infusion and equilibration times, they can potentially reduce vegetable quality and thus, are preferably avoided.

After the desired amount of infusion cocktail is absorbed by the vegetables or coated on the surfaces of the vegetables, the vegetables/cocktail mixture is allowed to equilibrate to provide a non-sticky, free flowing vegetable product without significant surface liquid or excess liquid in the bottom of the vegetables or the container. Equilibration can be carried out in a sealed container which also may serve as the packaging for retail sale or in an intermediate container for later repackaging in smaller containers which can then be sealed for retail sale. Generally, the equilibrating temperature is conducted at the same temperature as the storage temperature (i.e., refrigeration or ambient temperatures).

After completion of infusion and equilibration, the intermediate moisture vegetables of the present invention are ready for use. Preferably the sealed container used for the actual infusion process is also suitable for use as packaging for sale to the ultimate consumer. If repackaging of the intermediate moisture vegetables is necessary or desirable, the intermediate moisture vegetables, after removal of any excess liquid (if necessary), can be packaged separately or combined with other ingredients (having water activities similar to that of the intermediate moisture vegetables) before packaging (e.g., meal kits). Preferably, the relative amounts of vegetables and infusion cocktail are adjusted and controlled so that essentially all of the infusion cocktail is absorbed, thus, eliminating the need to remove excess liquid. If necessary, however, the excess liquid can be removed by draining (with or without gentle agitation) or more active processing techniques such as, for example, compressed gas or air sprays or blades (e.g., passing the vegetable pieces through a sterile air curtain), centrifugation, and the like. Generally, water washes are not necessary or desirable. Of course, it is preferred that the relative amounts of vegetables and infusion cocktail are such that there is little, and more preferably no, waste or spent infusion medium.

Preferably, the packaging material is designed to prevent, or at least significantly reduce, color and quality degradation, deterioration, or loss during storage. Preferably, the intermediate moisture vegetable are sealed in oxygen impermeable and light resistant or light proof packaging materials such as, for example, aluminum-polyester film under substantially oxygen-free conditions. Such substantially oxygen-free conditions can be obtained, for example, by inert gas (e.g., $N_2$) flushing prior to sealing or using vacuum packing techniques. The resulting intermediate moisture vegetables provide shelf stable, high quality vegetables having, when cooked or rehydrated by the consumer, organoleptic properties similar to IQF or fresh vegetables.

Intermediate moisture vegetables prepared by this invention with a water activity of about 0.5 to about 0.9 (and properly packaged) have a shelf life of at least about 150 days under refrigeration conditions; intermediate moisture vegetables with a water activity of about 0.5 to about 0.65 (and properly packaged) have a shelf life of about 2 months under ambient conditions. Storage under refrigeration conditions is generally preferred.

The following examples are intended to illustrate the invention and not to limit it. Unless otherwise indicated, all percentages used in the present specification are by weight. All patents and references cited in the present specification are hereby incorporated by reference.

EXAMPLE 1

A low water activity (about 0.6) and low viscosity (about 120 cps) infusion cocktail was prepared containing about 67 percent glycerol, about 30 percent water, and about 3 percent salt. The infusion cocktail (about 0.85 parts) was sprayed onto 1 part freeze dried green peas (water content less than about 4 percent). The resulting mixture was mixed occasionally during the first 5 minutes to provide uniform coverage and then allowed to equilibrate in a sealed glass jar for about 24 hours. No free infusion cocktail or separation of the infusion cocktail was observed after the 24 hour equilibration period. The resulting intermediate moisture ($A_w$ about 0.535) peas were bright green in color, plump and tender in texture, and free flowing. They could be easily rehydrated in hot water to produce excellent quality peas similar to freshly cooked peas.

Compared to conventional intermediate moisture vegetables prepared using an infusion cocktail containing about 60 percent maltose/dextrose, about 21 percent glycerol, about 1 percent salt, and about 18 percent water, the inventive intermediate moisture vegetables cost about 85 to 90 percent less (i.e., relative cost of about 10 to 15 units/serving for inventive intermediate moisture peas versus about 100 units/serving of conventional intermediate moisture peas) while producing peas of significantly better quality with regard to appearance, taste, and especially color.

EXAMPLE 2

A low water activity (about 0.61) and low viscosity (about 100 cps) infusion cocktail was prepared containing about 62 percent glycerol, about 33 percent water, and about 5 percent salt. The infusion cocktail (about 3.2 parts) was sprayed onto 1 part freeze dried green beans (moisture less than about 5 percent). The resulting mixture was mixed occasionally during the first 5 minutes to provide uniform coverage and then allowed to equilibrate in a sealed plastic pouch for about 24 hours in the dark. All of the infusion cocktail was absorbed by the green beans. The resulting intermediate moisture ($A_w$ about 0.589) green beans were bright green in color, plump and tender in texture, and free flowing. They could be easily rehydrated in hot water to produce excellent quality green beans similar to freshly cooked green beans. After one month of storage at ambient temperatures in the original sealed pouch, the color gradually faded (becoming olive green) although flavor and texture remained excellent.

EXAMPLE 3

Intermediate moisture green beans were prepared as in Example 2 except that the infusion cocktail was modified by addition of about 0.0005 percent $Mg(OH)_2$ and 0.02 percent $MgCl_2$. The resulting infusion cocktail had a pH of about 8.6. Color retention during ambient temperature storage was improved. Addition of $MgCl_2$ alone or removal of oxygen from the pouch only appeared to provide marginal improvement in color retention under ambient storage conditions.

Improvements in color retention appears to mainly due to controlling the pH of the infusion cocktail to values greater than about 8. Color retention could be further improved by refrigerated storage; in some cases, color retention for periods as long as 5 months were observed under refrigerated storage conditions.

EXAMPLE 4

A high water activity (about 0.79) and low viscosity (about 100 cps) infusion cocktail was prepared containing about 47 percent glycerol, about 49.4 percent water, about 3.1 percent salt, and about 0.5 percent flavors. The infusion cocktail (about 1.2 parts) was sprayed onto 1 part freeze dried green peas (water content less than about 4 percent). Due to the relatively high $A_w$, additional preservatives (e.g., sorbic acid, natural bacteriocin, and the like) may be optionally added to the infusion cocktail to further prevent microbial growth. The resulting mixture was mixed occasionally during the first 5 minutes to provide uniform coverage and then allowed to equilibrate in a sealed glass jar for about 24 hours. No free infusion cocktail or separation of the infusion cocktail was observed after the 24 hour equilibration period. The resulting intermediate moisture peas ($A_w$ about 0.74) were bright green in color, plump and tender in texture, and free flowing. Due to the relatively high water activity, refrigerated storage conditions should be used. The intermediate peas could be easily rehydrated in hot water to produce excellent quality green peas similar to freshly cooked green peas. Such high quality (e.g., bright green color) intermediate moisture peas can be maintained up to four months under refrigeration storage condition in a sealed pouch.

We claim:

1. A method for preparing intermediate moisture vegetables, said method comprising (1) predrying the vegetables to a moisture content of less than about 4 percent using gentle drying techniques so as to minimize damage to the cellular structure of the vegetables, (2) applying a low viscosity infusion cocktail comprising water, a polyhydric alcohol, and salt to the predried vegetables at or near ambient temperature and pressure, and (3) equilibrating the predried vegetables and infusion cocktail for at least about 30 minutes to provide the intermediate moisture vegetables having a water activity of about 0.5 to about 0.9; wherein the infusion cocktail contains essentially no sugars or saccharides.

2. The method as defined in claim 1, wherein the predried vegetables and infusion cocktail are equilibrated in a sealed container.

3. The method as defined in claim 2, wherein the infusion cocktail comprises about 30 to about 40 percent water, about 50 to about 75 percent polyhydric alcohol, and about 1 to about 10 percent salt.

4. The method as defined in claim 3, wherein the polyhydric alcohol is selected from the group consisting of glycerol, propylene glycol, and mixtures thereof.

5. The method as defined in claim 3, wherein the polyhydric alcohol is glycerol.

6. The method as defined in claim 2, wherein the sealed container is also suitable for use as a final packaging container.

7. The method as defined in claim 6, wherein the infusion cocktail further comprises at least one ingredient selected from the group consisting of spices, flavorants, nutrients, vitamins, nutraceutical additives, colorants, color enhancers, taste suppressants, and preservatives.

8. The method as defined in claim 6, wherein the infusion cocktail comprises about 30 to about 40 percent water, about 50 to about 75 percent polyhydric alcohol, and about 1 to about 10 percent salt.

9. The method as defined in claim 8, wherein the polyhydric alcohol is selected from the group consisting of glycerol, propylene glycol, and mixtures thereof.

10. The method as defined in claim 8, wherein the polyhydric alcohol is glycerol.

11. The method as defined in claim 1, wherein the infusion cocktail comprises about 30 to about 40 percent water, about 50 to about 75 percent polyhydric alcohol, and about 1 to about 10 percent salt.

12. The method as defined in claim 11, wherein the polyhydric alcohol is selected from the group consisting of glycerol, propylene glycol, and mixtures thereof.

13. The method as defined in claim 11, wherein the polyhydric alcohol is glycerol.

14. The method as defined in claim 1, wherein the polyhydric alcohol is glycerol.

15. The method as defined in claim 1, wherein about 0.5 to about 3.5 parts infusion cocktail is applied to 1 part predried vegetables.

16. The method as defined in claim 15, wherein the infusion cocktail further comprises at least one ingredient selected from the group consisting of spices, flavorants, nutrients, vitamins, nutraceutical additives, colorants, color enhancers, taste suppressants, and preservatives.

17. The method as defined in claim 1, wherein the infusion cocktail further comprises at least one ingredient selected from the group consisting of spices, flavorants, nutrients, vitamins, nutraceutical additives, colorants, color enhancers, taste suppressants, and preservatives.

18. A method for preparing intermediate moisture vegetables, said method comprising (1) applying a low viscosity infusion cocktail to vegetables having a moisture content of less than about 4 percent, at or near ambient temDerature and pressure, wherein the infusion cocktail comprises water, a polyhydric alcohol, and salt and (2) equilibrating the vegetables and infusion cocktail for at least about 30 minutes to provide the intermediate moisture vegetables; wherein the infusion cocktail contains essentially no sugars or saccharides.

19. The method as defined in claim 18, wherein the infusion cocktail of consists essentially of about 30 to about 40 percent water, about 50 to about 75 percent polyhydric alcohol, about 1 to about 10 percent salt, and 0 to about 5 percent of an optional ingredient selected from the group consisting of spices, flavorants, nutrients, vitamins, nutraceutical additives, colorants, color enhancers, taste suppressants, and mixtures thereof.

20. The method as defined in claim 19, wherein the polyhydric alcohol is selected from the group consisting of glycerol, propylene glycol, and mixtures thereof.

21. The method as defined in claim 19, wherein the polyhydric alcohol is glycerol.

22. The method as defined in claim 19, wherein about 0.5 to about 3.5 parts infusion cocktail is applied to 1 part vegetables.

23. The method as defined in claim 19, wherein the vegetables and infusion cocktail are equilibrated at or near ambient temperatures.

24. The method as defined in claim 23, wherein the sealed container is also suitable for use as a final packaging container.

25. The method as defined in claim 18, wherein the polyhydric alcohol is selected from the group consisting of glycerol, propylene glycol, and mixtures thereof.

26. The method as defined in claim 18, wherein the polyhydric alcohol is glycerol.

27. The method as defined in claim 18, wherein about 0.5 to about 3.5 parts infusion cocktail is applied to 1 part vegetables.

28. The method as defined in claim 18, wherein the vegetables and infusion cocktail are equilibrated at or near ambient temperatures.

29. The method as defined in claim 28, wherein the sealed container is also suitable for use as a final packaging container.

30. A method for preparing intermediate moisture green vegetables, said method comprising (1) applying an alkaline, low viscosity infusion cocktail comprising water, a polyhydric alcohol, an alkaline material, and salt to vegetables having moisture content of less than about 4 percent, at or near ambient temperature and pressure, and (2) equilibrating the vegetables and infusion cocktail for at least about 30 minutes to provide the intermediate moisture green vegetables having a water activity of about 0.5 to about 0.9; wherein the infusion cocktail contains essentially no sugars or saccharides.

31. The method as defined in claim 30, wherein the infusion cocktail of consists essentially of about 30 to about 40 percent water, about 50 to about 75 percent polyhydric alcohol, about 1 to about 10 percent salt, 0 to about 5 percent of an optional ingredient selected from the group consisting of spices, flavorants, nutrients, vitamins, nutraceutical additives, colorants, color enhancers, taste suppressants, and mixtures thereof, and sufficient alkaline material to achieve a pH of about 7.5 to about 9.

32. The method as defined in claim 31, wherein the polyhydric alcohol is selected from the group consisting of glycerol, propylene glycol, and mixtures thereof.

33. The method as defined in claim 31, wherein the polyhydric alcohol is glycerol.

34. The method as defined in claim 31, wherein about 0.5 to about 3.5 parts infusion cocktail is applied to 1 part vegetables.

35. The method as defined in claim 30, wherein the polyhydric alcohol is selected from the group consisting of glycerol, propylene glycol, and mixtures thereof.

36. The method as defined in claim 30, wherein the polyhydric alcohol is glycerol.

37. The method as defined in claim 30, wherein about 0.5 to about 3.5 parts infusion cocktail is applied to 1 part vegetables.

* * * * *

UNITED STATES PATENT AND TRADEMARK OFFICE
CERTIFICATE OF CORRECTION

PATENT NO. : 7,105,197 B2 Page 1 of 1
APPLICATION NO. : 10/354427
DATED : September 12, 2006
INVENTOR(S) : Loh et al.

It is certified that error appears in the above-identified patent and that said Letters Patent is hereby corrected as shown below:

-In col. 12, line 61, claim 18, delete "temDerature" and insert -- temperature -- .

-In col. 13, line 2, claim 19, delete "infusion cocktail of consists" and insert -- infusion of cocktail consists -- .

In col. 14, line 11, claim 31, delete "infusion cocktail of consists" and insert -- infusion of cocktail consists -- .

Signed and Sealed this

Twelfth Day of December, 2006

JON W. DUDAS
*Director of the United States Patent and Trademark Office*